(12) United States Patent
Carignan

(10) Patent No.: US 8,557,419 B2
(45) Date of Patent: Oct. 15, 2013

(54) SHAPE MEMORY CURRENT COLLECTING TERMINALS FOR ELECTROCHEMICAL CELLS

(75) Inventor: Claude Carignan, Varennes (CA)

(73) Assignee: Bathium Canada Inc., Boucherville, Quebec ( * ) Notice: Subject to any disclaimer, the term of this patent is extended or adjusted under 35 U.S.C. 154(b) by 0 days.

(21) Appl. No.: 12/874,808

(22) Filed: Sep. 2, 2010

(65) Prior Publication Data

US 2012/0058371 A1    Mar. 8, 2012

(51) Int. Cl.
*H01M 2/00* (2006.01)
*H01M 10/50* (2006.01)

(52) U.S. Cl.
USPC .............................................. 429/62; 429/61

(58) Field of Classification Search
None
See application file for complete search history.

(56) References Cited

U.S. PATENT DOCUMENTS

| | | | |
|---|---|---|---|
| 5,188,909 A * | 2/1993 | Pedicini | 429/7 |
| 5,691,073 A | 11/1997 | Vu et al. | |
| 5,800,939 A | 9/1998 | Mishina et al. | |
| 6,524,741 B1 * | 2/2003 | Bryan | 429/61 |
| 7,541,112 B2 | 6/2009 | Richard et al. | |
| 2004/0028999 A1 * | 2/2004 | Richard et al. | 429/149 |
| 2011/0045321 A1 | 2/2011 | Park et al. | |

FOREIGN PATENT DOCUMENTS

EP    0757394 A1    2/1997

* cited by examiner

*Primary Examiner* — Barbara Gilliam
*Assistant Examiner* — Jennifer Rea
(74) *Attorney, Agent, or Firm* — McMillan LLP

(57) ABSTRACT

An electrochemical cell battery is disclosed having current collecting terminals acting as security device. The battery includes a plurality of electrochemical cells connected in series or parallel. Each electrochemical cell has a current collecting terminal connecting the positive current collectors together and a current collecting terminal connecting the negative current collectors together. The current collecting terminals each have a folded extension arm for electrically connecting two adjacent electrochemical cells together. The folded extension arms have a shape memory characteristic and are electrically connected together via a welding metal having a fusion temperature $T_f$ of less than 180° C. whereby if a temperature of an electrochemical cells rises above the fusion temperature $T_f$ of the welding metal, the welded connection melts and the folded extension arms of the current collecting terminals spring back to their initial shape thereby severing the electrical connection between the electrochemical cells.

6 Claims, 3 Drawing Sheets

US 8,557,419 B2

SHAPE MEMORY CURRENT COLLECTING TERMINALS FOR ELECTROCHEMICAL CELLS

FIELD OF THE INVENTION

The present invention relates to electrochemical cells batteries and, more specifically, to electrochemical cell batteries having current collecting terminals acting as security device.

BACKGROUND OF THE INVENTION

The automotive industry has been seeking to commercialize a viable and safe electrical vehicle for several decades now. An important element of such a vehicle is its battery. The battery or batteries must not only provide the requisite level of energy and reasonable autonomy as well as be durable, but must also include or be equipped with security devices to prevent overcharge, over-discharge, internal and external short circuits and over-heating.

Security devices for batteries are typically in the form of electronic monitoring devices that monitor the voltage, the current and the temperature of the batteries which cut off the battery when a problem is detected. These electronic systems perform well under normal circumstances but may be unable to prevent damages to the battery in circumstances where an internal short-circuit occurs in the electrochemical cells of the battery. Internal short-circuits, although rare, can cause the temperature of the battery to rise to dangerous levels causing permanent damages to the battery and may also cause damages to the various components in the vicinity of the battery experiencing an internal short-circuit.

U.S. Pat. No. 6,099,986, issued Apr. 15, 2003, provides one solution to the potential problems of such internal short-circuits by including fuses between each connection of the electrochemical cells and the battery poles. This system of fuses cuts off the excessive electric current generated by a specific electrochemical cell experiencing an internal short-circuit from the other cells thereby limiting the damage caused by the internal short-circuit to the specific electrochemical cell. The system is however complex and cumbersome requiring multiple solder to connect each fuse to each electrochemical cell and requires added space to accommodate the plurality of fuses.

Therefore, there is a need for a security device which is less complex and cumbersome than the prior art and adapted to prevent damages in a battery experiencing an internal short-circuit.

SUMMARY OF THE INVENTION

It is an object of the present invention to ameliorate at least some of the inconveniences present in the prior art.

In one aspect, the invention provides a battery comprising a plurality of electrochemical cells connected in series or parallel. Each electrochemical cell comprises a series of primary laminates each including a negative electrode, a positive electrode, an electrolyte interposed between the negative and positive electrodes, a positive current collector extending from one side of the primary laminates and a negative current collector extending from an opposite side of the primary laminates. Each electrochemical cell has a current collecting terminal connecting the positive current collectors together and a current collecting terminal connecting the negative current collectors together. The current collecting terminals each have a folded extension arm for electrically connecting two adjacent electrochemical cells together. the folded extension arm has a shape memory characteristic. The electrochemical cells are electrically connected together via the folded extension arms of adjacent current collecting terminals welded together with a welding metal having a fusion temperature $T_f$ of less than 180° C. whereby if a temperature of an electrochemical cells rises above the fusion temperature $T_f$ of the welding metal, the welded connection melts and the folded extension arms of the current collecting terminals spring back to their initial shape thereby severing the electrical connection between the electrochemical cell having a temperature above the fusion temperature $T_f$ of the welding metal and adjacent electrochemical cells.

In a further aspect, the battery further comprises a biasing means positioned between the folded extension arms of two adjacent current collecting terminals which extends the length of the folded extension arms thereby providing added force to the shape memory characteristic of the folded extension arms such that the spring back force is increased when the welded connection is melted.

Embodiments of the present invention each have at least one of the above-mentioned aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 7 is a schematic front elevation view of the two current collecting terminals shown in FIG. 3 with a spring-like element in between;

DETAILED DESCRIPTION OF THE PREFERRED EMBODIMENTS

Figure 1:
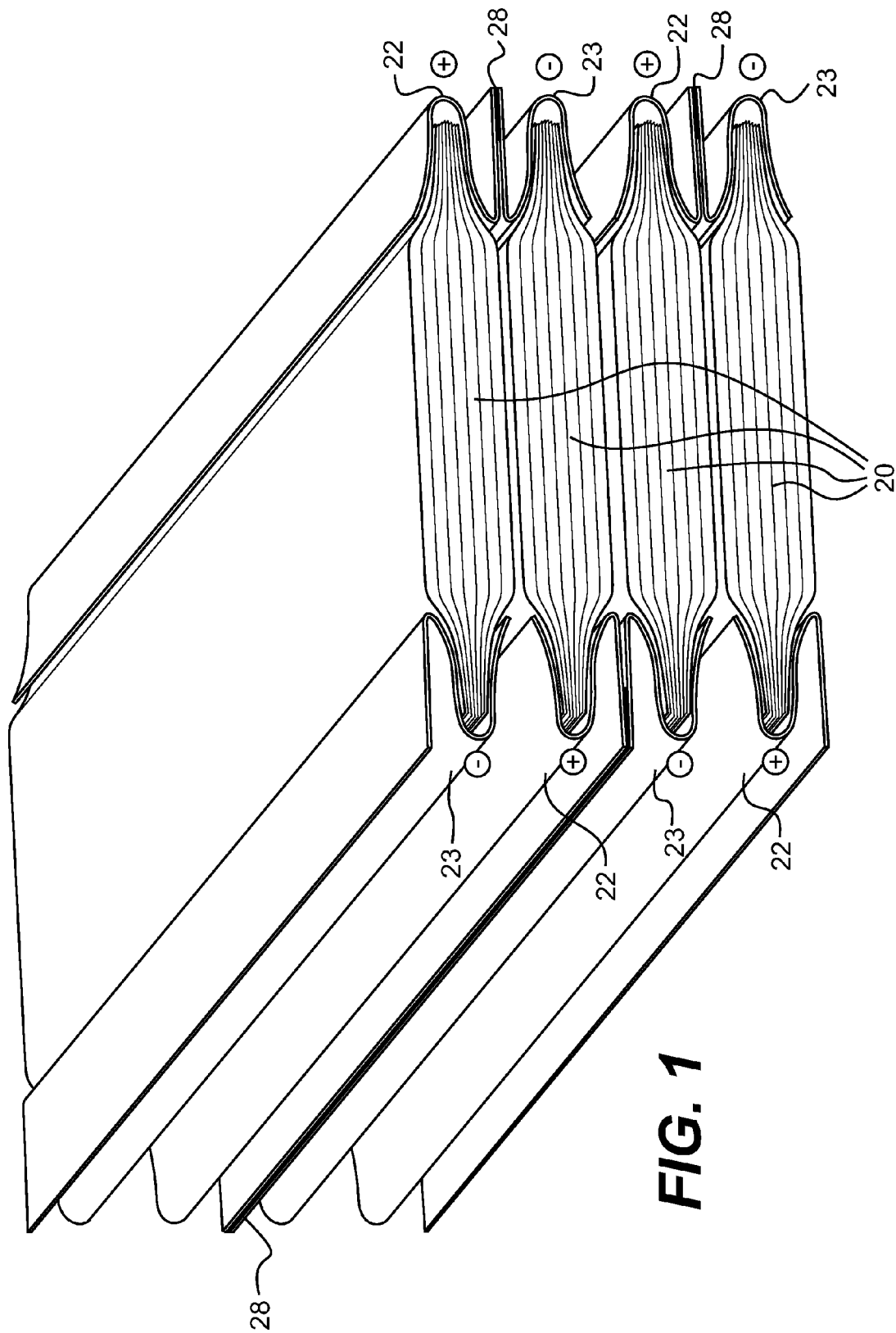
FIG. 1 is a schematic perspective view of a portion of a stack of electrochemical cells forming a battery connected in series with current collecting terminals in accordance with one embodiment of the invention.

With reference to FIG. 1, there is shown an example of a stack of electrochemical cells 20 forming a battery. Each electrochemical cell 20 comprises a series of primary laminates each including a negative sheet-like electrode, a positive sheet-like electrode, and a film of electrolyte interposed between the negative and positive electrodes. In addition, a sheet-like current collector supports the positive electrode which is typically a paste-like material in the form of a sheet. In the present example, the negative electrode is a lithium or lithium alloy metal sheet or foil, which acts both as a cation source and as a current collector. However, the negative electrode may also comprise a current collector sheet distinct from the active negative electrode material. For example, the negative electrode may be a composite comprising a current collector sheet preferably made of copper, a polymer, an electronic conductive filler, and an intercalation material.

Any intercalation material known to those skilled in the art may be used and, in particular, may be selected from the group consisting of: carbon, activated carbon, graphite, petroleum coke, a lithium alloy, nickel powder, lithium titanate, etc.

With respect to the positive electrode sheet, the latter typically comprises a compound of a polymer, a lithium salt, and electrochemically active material. Examples of suitable electrochemically active material include: $Li_xV_yO_z$; $LiCOO_2$; $Li_xMn_yO_z$; $LiNiO_2$; $LiFePO_4$; $V_xO_y$; $Mn_yO_z$; $Fe(PO_4)_3$; and $Li_xTi_yO_z$. In a preferred embodiment, cathode 24 preferably comprises $LiFePO_4$.

With respect to the electrolyte film, the electrolyte film is preferably solid and made of polymer mixed with a lithium salt, physically separating the negative and positive electrodes and also acting as an ion transporting membrane.

The current collector sheet, which serves the primary function of conducting the flow of electrons between the active material of electrode and the terminals of a battery (not shown), is typically constructed of a sheet of copper, nickel, or aluminum. In a preferred embodiment, the current collector of the positive electrode comprises an aluminum sheet or foil coated with a thin protective layer. The protective layer prevents degradation of the current collector sheet when it is in contact with the positive electrode material.

Each laminate of an electrochemical cell 20 is designed such that the current collector sheet of the positive electrode extends on one side of the electrochemical cell 20 while the lithium metal foil which acts as the current collector of the negative electrode extends on the opposite side of the electrochemical cell 20. As shown in FIG. 1, the extensions of the current collectors of all the positive electrodes of an electrochemical cell 20 are assembled and crimped together via a current collecting terminal 22 similar to those described in U.S. Pat. No. 7,541,112, issue Jun. 2, 2009, the entirety of which is incorporated herein by reference, in order to electrically connect all the current collectors of all the positive electrodes of an electrochemical cell 20 together. The extensions of the lithium metal foil of all the negative electrodes of an electrochemical cell 20 are similarly assembled and crimped together via a current collecting terminal 23 in order to electrically connect all extensions of the lithium metal foil of all the negative electrodes of an electrochemical cell 20 together.

As shown in FIG. 1, the current collecting terminals 22 and 23 extend the entire length of the electrochemical cells 20 and electrically connect a large surface area of the current collectors of the positive electrode and the extensions of the lithium foils of the negative electrodes respectively such that the electrical connections of the current collecting terminals 22 and 23 can accommodate high currents.

Figure 2:
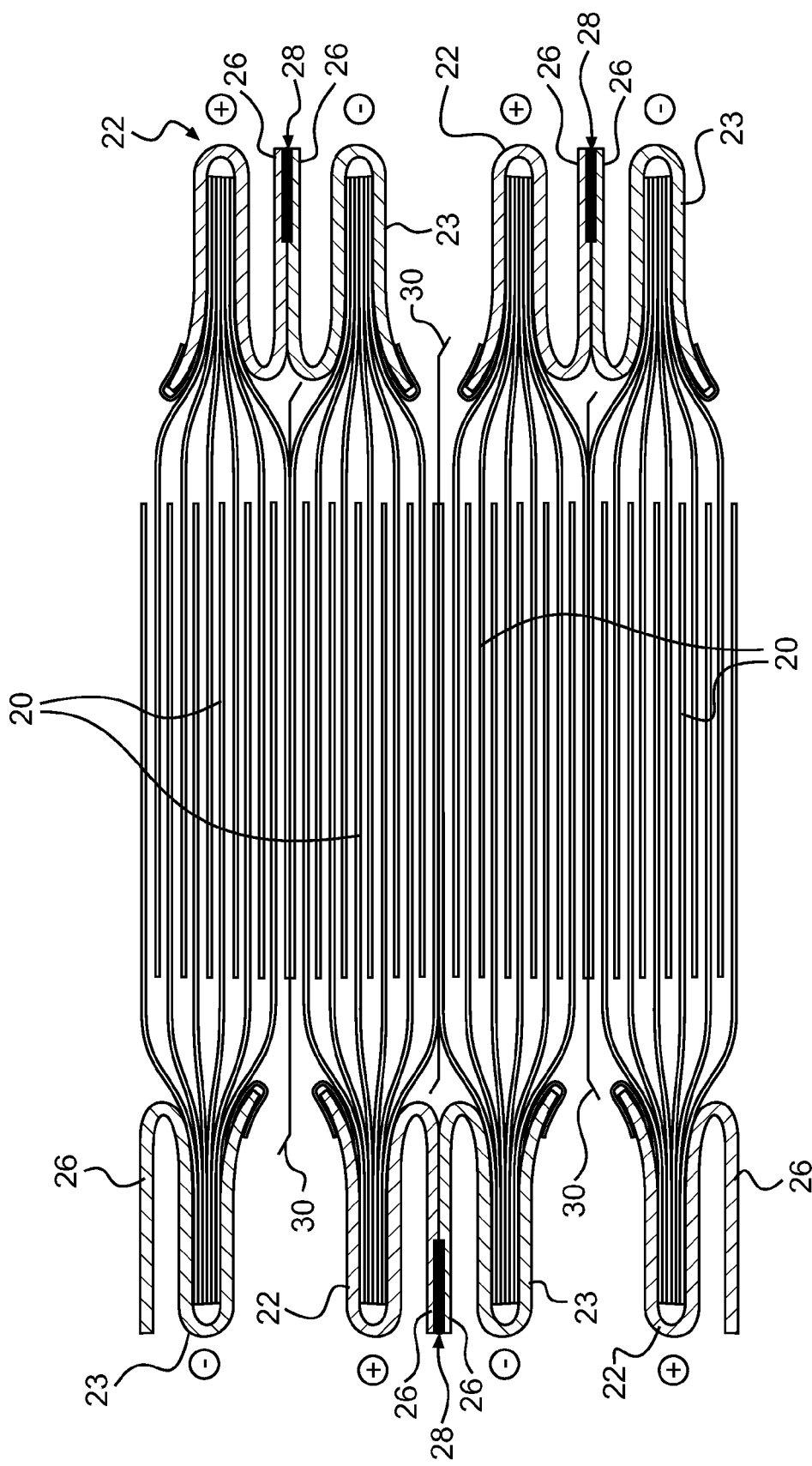
FIG. 2 is a schematic front elevation view of the portion of a stack of electrochemical cells shown in FIG. 1.

With reference to FIG. 2 illustrating the front portion of the stack of electrochemical cells 20 shown in FIG. 1 in elevation, the electrochemical cells 20 are electrically connected together in series via the current collecting terminals 22 and 23 wherein the negative current collecting terminals 23 are connected to the positive current collecting terminals 22 thereby increasing the voltage of the stack of electrochemical cells 20 with each added electrochemical cell 20 connected in series.

The current collecting terminals 22 and 23 feature folded extension arms 26 which are welded together as illustrated by the dark traces 28 when the stack of electrochemical cells 20 is assembled and electrically connected together. As illustrated in FIG. 1, the folded extension arms are welded together along their entire length. The folded extension arms 26 are bent such that when electrically connecting the stack of electrochemical cells 20 in series or parallel, the folded arms 26 of two adjacent current collecting terminals 22 and 23 are positioned side by side and are welded or soldered together to ensure good electrical contacts. The folded extension arms 26 of the two adjacent current collecting terminals 22 and 23 are welded along their entire lengths thereby providing a large surface area of contact between the adjacent current collecting terminals 22 and 23 in order to accommodate high current loads.

As shown in FIG. 2, the individual electrochemical cells 20 of the stack are separated by an insulating film of plastic material 30 such as polypropylene, to prevent direct contact and potential short circuit between the individual electrochemical cells 20.

Figure 3:
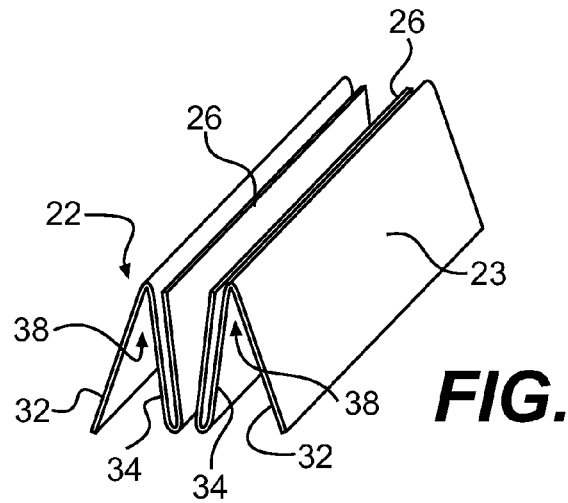
FIG. 3 is a schematic perspective view of two current collecting terminals in accordance with one embodiment of the invention.
Figure 4:
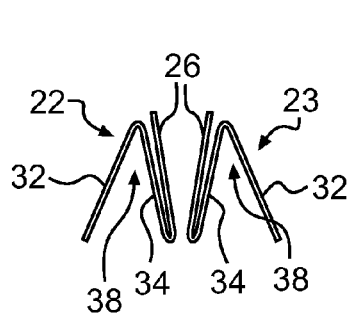
FIG. 4 is a schematic front elevation view of the two current collecting terminals shown in FIG. 3.

Referring now to FIGS. 3 and 4, current collecting terminals 22 and 23 include a pair of spaced-apart arms 32 and 34 that diverge from one another to form a recess 38 therebetween. The recess 38 is shaped such that it is capable of snugly receiving all the current collectors of the positive electrodes or all the extensions of the lithium foils of the negative electrodes of the electrochemical cells 20 therein prior to being crimped onto the current collectors or the extensions of the lithium foils. As illustrated, the folded extension arms 26 of the current collecting terminals 22 and 23 are bent backward towards the arms 34 such that when positioned side by side, the folded arm 26 of the current collecting terminals 22 and 23 extend away from each other. The folded extension arms 26 are purposely bent backward as illustrated in FIGS. 3 and 4 in order to induce a shape memory characteristic to the folded arms 26 such that they will have a tendency to move away from each other when they are not mechanically connected together and more importantly, if and when the mechanical connection is broken.

Figure 5:
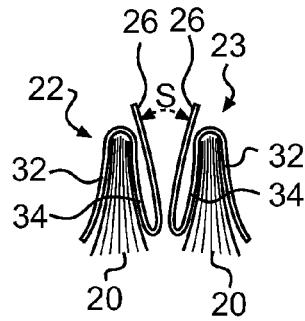
FIG. 5 is a schematic front elevation view of the two current collecting terminals shown in FIGS. 3 and 4 crimped onto the laminates of two adjacent electrochemical cells prior to being electrically connected together.

With reference to FIG. 5, the pair of arms 32 and 34 of the current collecting terminal 22 are crimped onto all the current collectors of all the positive electrodes of a first electrochemical cell 20 and the pair of arms 32 and 34 of the current collecting terminal 23 are crimped onto all the extensions of the lithium metal foil of all the negative electrodes of a second electrochemical cell 20 adjacent the first electrochemical cell 20. The folded extension arms 26 remain bent backward and spaced apart due to their initial shape.

Figure 6:
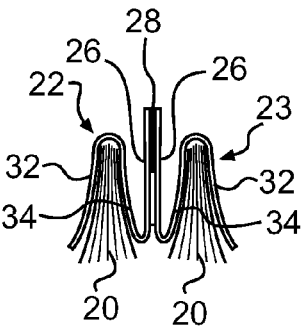
FIG. 6 is a schematic front elevation view of the two current collecting terminals of FIG. 5 electrically connected together.

With reference to FIG. 6, the folded extension arms 26 of the adjacent current collecting terminals 22 and 23 are brought together and their edges welded together as illustrated by the dark traces 28. As shown in FIG. 1, the edges of the extension arms 26 are welded along their entire length. The folded extension arms 26 are welded with a specific metal or metal alloy having a fusion temperature $T_f$ of 180° C. or less such as Bismuth (Bi) or Bismuth-Tin (Bi—Sn) to effect the electrical connection between the current collecting terminals 22 and 23 and the first and second electrochemical cell 20.

In the event of an internal short circuit in the battery having multiple electrochemical cells 20, the temperature of the battery and specifically the temperature of the electrochemical cell or cells 20 experiencing the internal short circuit will rise rapidly to unsafe levels. When the temperature of one of the electrochemical cells 20 reaches the fusion temperature $T_f$ of the welding metal (180° C. or less), the welding metal will melt causing the folded extension arms 26 to spring back to their original shape as shown by the dotted arrows S in FIG. 5 and separate thereby severing the electrical connection between adjacent electrochemical cells and cutting the short-circuit and preventing the rapid temperature rise that would theoretically occur if the short-circuit was not cut. The combination of the shape memory of the folded extension arms 26 and the fusion temperature $T_f$ of the metal used to weld two adjacent current collecting terminals 22 and 23 provides an added safety feature to the battery that enables the electrical isolation of one or more electrochemical cells 20 in the event of an internal short circuit.

Figure 7:
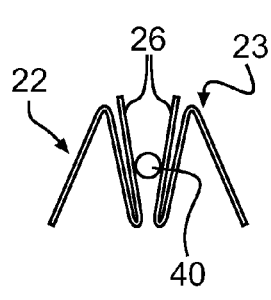

FIG. 7 illustrates a second embodiment of the invention wherein the same current collecting terminals 22 and 23 are complemented with a biasing means 40 in the form of a resilient cord, tube or stick made of non-conductive rubber, plastic or polymer positioned between the folded extension arms 26 of two adjacent current collecting terminals 22 and 23 which extend the length of the current collecting terminals 22 and 23. As previously mentioned, the folded extension arms 26 are bent backward and have a shape memory characteristic such that they have a tendency to move away from each other when they are not mechanically connected together. The biasing means 40 provides added force to the shape memory characteristic of the folded extension arms 26 such that the spring back force is increased when the welding metal is melted. The biasing means 40 also ensures that the folded extension arms 26 of the adjacent current collecting terminals 22 and 23 do not reconnect when separated.

Figure 8:
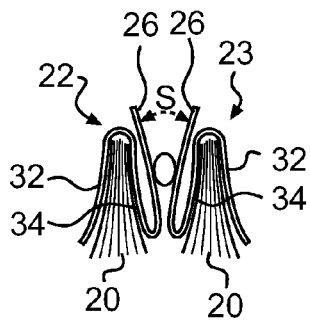
FIG. 8 is a schematic front elevation view of the two current collecting terminals shown in FIG. 7 crimped onto the laminates of two adjacent electrochemical cells prior to being electrically connected together.
Figure 9:
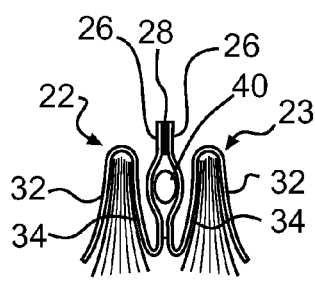
FIG. 9 is a schematic front elevation view of the two current collecting terminals shown in FIG. 8 electrically connected together.

As shown in FIG. 8, the pair of arms 32 and 34 of the current collecting terminal 22 are crimped onto all the current collectors of all the positive electrodes of a first electrochemical cell 20 and the pair of arms 32 and 34 of the current collecting terminal 23 are crimped onto all the extensions of the lithium metal foil of all the negative electrodes of a second electrochemical cell 20 adjacent the first electrochemical cell 20. The folded extension arms 26 remain bent backward and spaced apart due to their initial shape. The biasing means 40 in the form of a rubbery cord is inserted in the space between the two adjacent folded extension arms 26 as illustrated. With reference to FIG. 9, the folded extension arms 26 of the adjacent current collecting terminals 22 and 23 are brought together and their edges welded together as illustrated by the dark traces 28. As shown in FIG. 1, the edges of the extension arms 26 are welded along the entire length. As shown in FIG. 9, the folded extension arms 26 are brought together and their edges welded together as illustrated by the dark traces 28. The folded extension arms 26 are welded with a specific metal or metal alloy having a fusion temperature $T_f$ of 180° C. or less such as bismuth (Bi) and bismuth-tin alloy (Bi—Sn) to effect the electrical connection between the current collecting terminals 22 and 23 of the first and second electrochemical cell 20 and the biasing means 40 is squeezed and trapped between the welded extension arms 26.

In the event of an internal short circuit in the battery having multiple electrochemical cells 20, the temperature of the battery and specifically the temperature of the electrochemical cell or cells 20 experiencing the internal short circuit rise rapidly to unsafe levels. When the temperature of one of the electrochemical cells 20 reaches the fusion temperature $T_f$ of the welding metal (180° C. or less), the welding metal melts and the folded extension arms 26 spring back to their original shape as shown by the dotted arrows S in FIG. 8, forced outwardly by the shape memory characteristic of the folded extension arms 26 and by the force of the biasing means 40 squeezed between the folded extension arms 26 which expands back to its original shape. The folded extension arms 26 are separated thereby cutting the electrical connection and the short-circuit between adjacent electrochemical cells and preventing the rapid temperature rise that would theoretically occur if the electrical connection was not cut. The biasing means 40 provides added force to separate the folded extension arms 26 once the welding metal is melted. The combination the fusion temperature $T_f$ of the welding metal, the shape memory of the folded extension arms 26 and the biasing means 40 provide an added safety feature to the battery that enables the electrical isolation of one or more electrochemical cells 20 in the event of an internal short circuit.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A battery comprising a plurality of electrochemical cells connected in series or parallel;

each electrochemical cell comprises a series of primary laminates each including a negative electrode, a positive electrode, an electrolyte interposed between the negative and positive electrodes, a positive current collector extending from one side of the primary laminates and a negative current collector extending from an opposite side of the primary laminates;

each electrochemical cell having a current collecting terminal connecting the positive current collectors together and a current collecting terminal connecting the negative current collectors together;

the current collecting terminals each having a pair of spaced-apart arms forming a recess in which either the positive or negative current collectors are crimped together, and a folded extension arm for electrically connecting two adjacent electrochemical cells together, the folded extension arm bent backward to induce a shape memory such that two adjacent folded extension arms remain spaced apart from each other when not mechanically connected together;

the electrochemical cells being electrically and mechanically connected together with a weld between the folded extension arms of adjacent current collecting terminals together with a welding metal having a fusion temperature $T_f$ of less than 180° C. whereby if a temperature of an electrochemical cell rises above the fusion temperature $T_f$ of the welding metal, the welded connection melts and the folded extension arms of the current collecting terminals spring back to their initial bent backward position thereby severing the electrical connection between the electrochemical cell having a temperature above the fusion temperature $T_f$ of the welding metal and adjacent electrochemical cells.

2. A battery as defined in claim 1, wherein the negative electrode consists of a lithium metal foil acting as both the negative electrode and the current collector of the negative electrode.

3. A battery as defined in claim 1, wherein the welding metal is selected from the group of bismuth and Bismuth based alloys.

4. A battery as defined in claim 1, further comprising a biasing means positioned between the folded extension arms of two adjacent current collecting terminals which extend the length of the folded extension arms.

5. A battery as defined in claim 1, wherein the biasing means is selected from the group of resilient cord, resilient tube and resilient stick.

6. A battery as defined in claim 5, wherein the biasing means is made of a non-conductive material.

* * * * *